United States Patent
Fontoura et al.

(10) Patent No.: US 7,424,467 B2
(45) Date of Patent: Sep. 9, 2008

(54) ARCHITECTURE FOR AN INDEXER WITH FIXED WIDTH SORT AND VARIABLE WIDTH SORT

(75) Inventors: Marcus F. Fontoura, San Jose, CA (US); Andreas Neumann, Gilroy, CA (US); Sridhar Rajagopalan, Oakland, CA (US); Eugene J. Shekita, San Jose, CA (US); Jason Yeong Zien, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 10/764,800

(22) Filed: Jan. 26, 2004

(65) Prior Publication Data

US 2005/0165838 A1  Jul. 28, 2005

(51) Int. Cl.
*G06F 17/30* (2006.01)
(52) U.S. Cl. .......................... 707/2; 707/7; 707/101; 707/102; 715/225
(58) Field of Classification Search ............... 707/1–10, 707/100–104.1, 200–205; 709/215; 715/508
See application file for complete search history.

(56) References Cited

U.S. PATENT DOCUMENTS

| | | | |
|---|---|---|---|
| 4,965,763 A | 10/1990 | Zamora | |
| 5,187,790 A | 2/1993 | East et al. | |
| 5,265,221 A | 11/1993 | Miller | |
| 5,287,496 A | 2/1994 | Chen et al. | |
| 5,297,039 A | 3/1994 | Kanaegami et al. | |
| 5,574,906 A | 11/1996 | Morris | |
| 5,638,543 A | 6/1997 | Pedersen et al. | |
| 5,685,003 A | 11/1997 | Peltonen et al. | |
| 5,701,469 A | 12/1997 | Brandli et al. | |
| 5,708,825 A | 1/1998 | Sotomayor | |
| 5,721,938 A | 2/1998 | Stuckey | |
| 5,721,939 A | 2/1998 | Kaplan | |
| 5,724,033 A | 3/1998 | Burrows | |
| 5,729,730 A * | 3/1998 | Wlaschin et al. | ............... 707/3 |
| 5,745,889 A | 4/1998 | Burrows | |

(Continued)

FOREIGN PATENT DOCUMENTS

EP  0 809 197  11/1997

(Continued)

OTHER PUBLICATIONS

Macurious Software Foundation. *Macurious Spider Frequently Asked Questions* 3.0 [online][retrieved on Oct. 8, 2003]. Available from http://www.macurious.com/spider/faq.htm.

(Continued)

*Primary Examiner*—Shahid Al Alam
(74) *Attorney, Agent, or Firm*—Janaki Komanduri Davda; Konrad Raynes & Victor LLP

(57) ABSTRACT

Disclosed is a technique for indexing data. A token is received. It is determined whether a data field associated with the token is a fixed width. When the data field is a fixed width, the token is designated as one for which fixed width sort is to be performed. When the data field is a variable length, the token is designated as one for which a variable width sort is to be performed.

18 Claims, 11 Drawing Sheets

U.S. PATENT DOCUMENTS

| | | |
|---|---|---|
| 5,745,890 A | 4/1998 | Burrows |
| 5,745,894 A | 4/1998 | Burrows et al. |
| 5,745,898 A | 4/1998 | Burrows |
| 5,745,899 A | 4/1998 | Burrows |
| 5,745,900 A | 4/1998 | Burrows |
| 5,745,904 A | 4/1998 | King et al. |
| 5,745,906 A | 4/1998 | Squibb |
| 5,765,149 A | 6/1998 | Burrows |
| 5,765,150 A | 6/1998 | Burrows |
| 5,765,158 A | 6/1998 | Burrows |
| 5,765,168 A | 6/1998 | Burrows |
| 5,787,435 A | 7/1998 | Burrows |
| 5,797,008 A | 8/1998 | Burrows |
| 5,809,502 A | 9/1998 | Burrows |
| 5,832,480 A | 11/1998 | Byrd, Jr. et al. |
| 5,832,500 A | 11/1998 | Burrows |
| 5,832,519 A | 11/1998 | Bowen et al. |
| 5,852,820 A | 12/1998 | Burrows |
| 5,862,325 A | 1/1999 | Reed et al. |
| 5,864,863 A | 1/1999 | Burrows |
| 5,873,097 A | 2/1999 | Harris et al. |
| 5,884,305 A | 3/1999 | Kleinberg et al. |
| 5,890,103 A | 3/1999 | Carus |
| 5,893,119 A | 4/1999 | Squibb |
| 5,903,646 A | 5/1999 | Rackman |
| 5,903,891 A | 5/1999 | Chen et al. |
| 5,909,677 A | 6/1999 | Broder et al. |
| 5,914,679 A | 6/1999 | Burrows |
| 5,915,251 A | 6/1999 | Burrows et al. |
| 5,920,859 A | 7/1999 | Li |
| 5,933,822 A | 8/1999 | Braden-Harder et al. |
| 5,963,940 A | 10/1999 | Liddy et al. |
| 5,963,954 A | 10/1999 | Burrows |
| 5,966,703 A | 10/1999 | Burrows |
| 5,966,710 A | 10/1999 | Burrows |
| 5,970,497 A | 10/1999 | Burrows |
| 5,974,412 A | 10/1999 | Hazlehurst et al. |
| 5,995,980 A | 11/1999 | Olson et al. |
| 6,005,503 A | 12/1999 | Burrows |
| 6,016,493 A | 1/2000 | Burrows |
| 6,016,501 A | 1/2000 | Martin et al. |
| 6,021,409 A | 2/2000 | Burrows |
| 6,026,388 A | 2/2000 | Liddy et al. |
| 6,026,413 A | 2/2000 | Challenger et al. |
| 6,029,165 A | 2/2000 | Gable |
| 6,035,268 A | 3/2000 | Carus et al. |
| 6,047,286 A | 4/2000 | Burrows |
| 6,067,543 A | 5/2000 | Burrows |
| 6,078,914 A | 6/2000 | Redfern |
| 6,078,916 A | 6/2000 | Culliss |
| 6,078,923 A | 6/2000 | Burrows |
| 6,088,694 A | 7/2000 | Burns et al. |
| 6,105,019 A | 8/2000 | Burrows |
| 6,119,124 A | 9/2000 | Broder et al. |
| 6,182,062 B1 | 1/2001 | Fujisawa et al. |
| 6,182,121 B1 * | 1/2001 | Wlaschin .................... 709/215 |
| 6,192,258 B1 | 2/2001 | Kamada et al. |
| 6,192,333 B1 | 2/2001 | Pentheroudakis |
| 6,205,451 B1 | 3/2001 | Norcott et al. |
| 6,205,456 B1 | 3/2001 | Nakao |
| 6,216,175 B1 | 4/2001 | Sliger et al. |
| 6,233,571 B1 | 5/2001 | Egger et al. |
| 6,243,713 B1 | 6/2001 | Nelson et al. |
| 6,243,718 B1 | 6/2001 | Klein et al. |
| 6,269,361 B1 | 7/2001 | Davis et al. |
| 6,278,992 B1 | 8/2001 | Curtis et al. |
| 6,285,999 B1 | 9/2001 | Page |
| 6,295,529 B1 | 9/2001 | Corston-Oliver et al. |
| 6,308,179 B1 | 10/2001 | Petersen et al. |
| 6,324,566 B1 | 11/2001 | Himmel et al. |
| 6,336,117 B1 | 1/2002 | Massarani |
| 6,339,772 B1 | 1/2002 | Klein et al. |
| 6,374,268 B1 | 4/2002 | Testardi |
| 6,381,602 B1 | 4/2002 | Shoroff et al. |
| 6,385,616 B1 | 5/2002 | Gardner |
| 6,418,433 B1 | 7/2002 | Chakrabarti et al. |
| 6,421,655 B1 | 7/2002 | Horvitz et al. |
| 6,463,439 B1 | 10/2002 | Dahlberg |
| 6,519,592 B1 | 2/2003 | Getchius et al. |
| 6,519,593 B1 | 2/2003 | Matias et al. |
| 6,519,597 B1 | 2/2003 | Cheng et al. |
| 6,542,906 B2 | 4/2003 | Korn |
| 6,547,829 B1 | 4/2003 | Meyerzon et al. |
| 6,553,385 B2 | 4/2003 | Johnson et al. |
| 6,567,804 B1 | 5/2003 | Ramasamy et al. |
| 6,578,032 B1 | 6/2003 | Chandrasekar et al. |
| 6,584,458 B1 | 6/2003 | Millett et al. |
| 6,594,682 B2 | 7/2003 | Peterson et al. |
| 6,615,209 B1 | 9/2003 | Gomes et al. |
| 6,618,725 B1 | 9/2003 | Fukuda et al. |
| 6,622,211 B2 | 9/2003 | Henry et al. |
| 6,631,369 B1 | 10/2003 | Meyerzon et al. |
| 6,631,496 B1 | 10/2003 | Li et al. |
| 6,633,872 B2 | 10/2003 | Ambrosini et al. |
| 6,643,650 B1 | 11/2003 | Slaughter et al. |
| 6,658,406 B1 | 12/2003 | Mazner et al. |
| 6,658,423 B1 | 12/2003 | Pugh et al. |
| 6,665,657 B1 | 12/2003 | Dibachi |
| 6,678,409 B1 | 1/2004 | Wu et al. |
| 6,754,873 B1 | 6/2004 | Law et al. |
| 6,763,362 B2 | 7/2004 | McKeeth |
| 6,766,316 B2 | 7/2004 | Caudill |
| 6,789,077 B1 | 9/2004 | Slaughter et al. |
| 6,810,375 B1 | 10/2004 | Ejerhed |
| 6,839,665 B1 | 1/2005 | Meyers |
| 6,839,702 B1 | 1/2005 | Patel et al. |
| 6,839,843 B1 | 1/2005 | Bacha et al. |
| 6,842,730 B1 | 1/2005 | Ejerhed et al. |
| 6,845,009 B1 | 1/2005 | Whitted |
| 6,850,979 B1 | 2/2005 | Saulpaugh et al. |
| 6,865,575 B1 | 3/2005 | Smith et al. |
| 6,868,447 B1 | 3/2005 | Slaughter et al. |
| 6,870,095 B1 | 3/2005 | Whitted |
| 6,877,136 B2 | 4/2005 | Bess et al. |
| 6,904,454 B2 | 6/2005 | Stickler |
| 6,906,920 B1 | 6/2005 | Whitted |
| 6,934,634 B1 | 8/2005 | Ge |
| 7,051,023 B2 | 5/2006 | Kapur et al. |
| 8,031,954 | 6/2006 | Kirsch |
| 2001/0027451 A1 | 10/2001 | Taguchi et al. |
| 2001/0049671 A1 | 12/2001 | Joerg |
| 2002/0006112 A1 | 1/2002 | Jaber et al. |
| 2002/0032677 A1 | 3/2002 | Morgenthaler et al. |
| 2002/0032705 A1 | 3/2002 | Higashiyama et al. |
| 2002/0065957 A1 | 5/2002 | Rubin et al. |
| 2002/0099723 A1 | 7/2002 | Garcia-Chiesa |
| 2002/0120685 A1 | 8/2002 | Srivastava et al. |
| 2002/0129014 A1 | 9/2002 | Kim et al. |
| 2002/0129015 A1 | 9/2002 | Caudill et al. |
| 2002/0169770 A1 | 11/2002 | Kim et al. |
| 2002/0174149 A1 | 11/2002 | Conroy et al. |
| 2002/0188615 A1 | 12/2002 | Latarche et al. |
| 2003/0028564 A1 | 2/2003 | Sanfilippo |
| 2003/0046311 A1 | 3/2003 | Baidya et al. |
| 2003/0055626 A1 | 3/2003 | Miyahira et al. |
| 2003/0093409 A1 | 5/2003 | Weil et al. |
| 2003/0163454 A1 | 8/2003 | Jacobsen et al. |
| 2003/0177127 A1 | 9/2003 | Goodwin et al. |
| 2003/0182282 A1 | 9/2003 | Ripley |
| 2003/0187833 A1 | 10/2003 | Plu |
| 2003/0217052 A1 | 11/2003 | Rubenczyk et al. |
| 2003/0225763 A1 | 12/2003 | Guilak et al. |
| 2003/0225779 A1 | 12/2003 | Matsuda |
| 2003/0229604 A1 | 12/2003 | Zaragoza et al. |

| | | | |
|---|---|---|---|
| 2004/0078356 A1 | 4/2004 | Mazner et al. | |
| 2004/0078753 A1 | 4/2004 | Doyle | |
| 2004/0111408 A1 | 6/2004 | Caudill et al. | |
| 2004/0123104 A1 | 6/2004 | Boyen et al. | |
| 2004/0162997 A1 | 8/2004 | Hopmann et al. | |
| 2004/0215606 A1 | 10/2004 | Cossock | |
| 2004/0243554 A1 | 12/2004 | Broder et al. | |
| 2004/0243556 A1 | 12/2004 | Ferrucci et al. | |
| 2004/0243557 A1 | 12/2004 | Broder et al. | |
| 2004/0243560 A1 | 12/2004 | Broder et al. | |
| 2004/0243581 A1 | 12/2004 | Weissman et al. | |
| 2004/0243645 A1 | 12/2004 | Broder et al. | |
| 2005/0044411 A1 | 2/2005 | Somin et al. | |
| 2005/0120004 A1 | 6/2005 | Stata et al. | |
| 2005/0149499 A1 | 7/2005 | Franz et al. | |
| 2005/0149576 A1 | 7/2005 | Marmaros et al. | |
| 2005/0149851 A1 | 7/2005 | Mittal | |
| 2005/0198076 A1 | 9/2005 | Stata et al. | |
| 2006/0047825 A1 | 3/2006 | Steenstra et al. | |
| 2006/0074962 A1 | 4/2006 | Fontoura et al. | |

FOREIGN PATENT DOCUMENTS

| | | |
|---|---|---|
| JP | 10289246 | 10/1998 |
| JP | 10293767 | 11/1998 |
| JP | 2000339309 | 12/2000 |
| WO | 9749048 | 12/1997 |

OTHER PUBLICATIONS

Miscellaneous Articles from Newsgroups, Available from: (1) Newsgroups:google.public.support.general; Date: Jul. 5, 2002 and Jul. 6, 2002; (2) Newsgroups: comp.protocols.tcp-ip.domains; Date Apr. 8, 2000; (3) Newsgroups: microsoft.public.frontpage.client; Date: Mar. 18, 1999 [3 entries] and Mar. 19, 1999 and (4) Newsgroups:alt.internet.search-engines; Date: Jan. 26, 2002.
Kaindl. H., et al.. "Combining Structure Search and Content Search for the World-Wide Web," 1998 ACM, ISBN 0-89791-972-6-Jun. 1998, pp. 217-224.
Weinreich, H., et al.. "The Look of the Link—Concepts for the User Interface of Extended Hyperlinks," 2001, ACM ISBN 1-59113-420—Jul. 1, 2001, pp. 19-28.
Dieberger, A. "Context Lenses—Document Visualization and Navigation Tools for Rapid Access to Detail." In Human-Computer Interaction INTERACT '01. IFIP TC. 13 International Conference on Human-Computer Interaction, Jul. 9-13, 2001, Tokyo, Japan, IOS Press. Title page, copyright page and article (pp. 545-552).
Hardman, L. "Links in Hypermedia: the Requirement for Context." $5^{th}$ ACM Conference on Hypertext, '93 Proceedings, pp. 183-191.
Baeza-Yates, R. and B. Ribeiro-Neto. "Modern Inforamtion Retrieval." England: Pearson Education Limited, 1999, title page, copyright page, table of contents (ix-xvi) and Chapter 8 "Indexing and Searching" (pp. 191-199, 222-228, 382-384).
Lipyeow, L. et al. "Dynamic Maintenance of Web Indexes Using Landmarks," 10 pages. WWW2003, May 20-24, 2003, Budapest, Hungary. ACM. Available from http://citreseer.nj.nec.com/590376.html.
Zobel, J. et al. "In-Memory Hash Tables for Accumulating Text Vocabularies," pp. 1-9. Information Processing Letters, vol. 80, No. 6, pp. 271-277, 2001. Available from http://citeseer.nj.nec.com/529586.html.
Brown, E. et al. "Execution Performance Issues in Full-Text Information Retrieval." Technical Report 95-81, Oct. 1995. Computer Science Department, Amherst, MA (Ph.D. Thesis), 179 pages. Available from http://citeseer.nj.nec.com/brown95execution.html.
Brown, E. et al. "Fast Incremental Indexing for Full-Text Information Retrieval," pp. 1-11. Proceedings of the $20^{th}$ VLDB Conference, pp. 192-202, Santiago, Chile, 1994. Available from http://citeseer.nj.nec.com/brown94fast.html.
Lu, Z. "Scalable Distributed Architectures for Information Retrieval." Amherst, MA (Ph.D. Thesis), 178 pages. Available from http://citeseer.nj.nec.com/luscalable.html.
Agarwal, R.C. "A Super Scalar Sort Algorithm for RISC Processors," pp. 240-246. Proceedings of the 1996 ACM SIGMOD International Conference on Management of Data, 1996. Available from http://citeseer.nj.nec.com/agarwal96super.html.
Arpaci-Dusseau, A.C. et al. "High Performance Sorting on Networks of Workstations," 12 pages. Proceedings of the 1996 ACM SIGMOD International Conference on Management of Data, 1997. Available from http://portal.acm.org/citation.cfm?id-253322&coll=portal&dl=ACM&CFID=13536765&CFTOKEN=64334274.
Clarke, C.L.A., et al. "Shortest Substring Ranking (MultiText Experiments for TREC-4)," pp. 1-10. Proceedings of the Fourth Text Retrieval Conference, Nov. 1995, Available from http://citeseer.nj.nec.com/84012.html.
Tomasic, A. et al. "Performance of Inverted Indices in Shared-Nothing Distributed Text Document Information Retrieval Systems," 11 pages. Proceedings of the $2^{nd}$ International Conference on Parallel and Distributed Information Systems, Jan. 1983url=.
Tomasic, et al. "Incremental Updates of Inverted Lists for Text Document Retrieval," pp. 143. Available from http://citeseer.nj.nec.com/tomasic93incremental.html.
Melnik, S. et al. "Building a Distributed Full-Text Index for the Web," 10 pages, 2001. In World Wide Web, pp. 396-406. Available from http://citeseer.nj.nec.com/long03optimized.html.
Long, X and T. Suel. "Optimized Query Execution in Large Search Engines with Global Page Ordering," 12 pages. Proceedings of the $29^{th}$ VLDB Conference, Berlin, Germany, 2003. Available from http://citeseer.nj.nec.com/long03optimized.html.
Callan, J.P et al. "The INQUERY Retrieval System," 9 pages. Proceedings {DEXA}-92, $3^{rd}$ International Conference on Database and Expert Systems Applications, pp. 78-83, 1992. Available from http://citeseer.nj.nec.com/26307.html.
Pearson, P.K. "Fast Hashing of Variable Length Text Strings," pp. 677-680. Communications of the ACM, Jun. 1990, vol. 33, No. 6.
Witten, I.H., et al. "Managing Gigabytes. Compressing and Indexing Documents and Images." San Francisco: Morgan Kaufmann Publishers, 1999, title page, copyright page, table of contents (v-xi) and Chapter 5, "Index Construction" (pp. 223-261).
Corme, T.H., et al. "Introduction to Algorithms." Cambridge: The MIT Press, Second Edition, 2003, title page, copyright page, table of contents (v-xi) and Chapter 8 "Sorting in Linear Time" (pp. 165-177).
Sedgewick, R. "Algorithms in C++. Parts 1-4." Boston: Addison-Wesley Publishing Co., 1998. title page, copyright page, table of contents (xv-xix) and Chapter 10 "Radix Sorting" (pp. 417-433, 436-450).
U.S. Appl. No. 10/764,771, filed on Jan. 26, 2004, entitled Method, System, and Program for Handling Redirects in a Search Engine, by M. F. Fontoura, et al.
U.S. Appl. No. 10/764,801, filed on Jan. 26, 2004, entitled Method, System, and Program for Handling Anchor Text, by R. Kraft, et al.
U.S. Appl. No. 10/764,772, filed on Jan. 26, 2004, entitled A Pipelined Architecture for Global Analysis and Index Building, by M. F. Foutoura, et al.
Agrawal, S., S Chaudhuri and G. Das, "DBXplorer: A System for Keyword-Based Search over Relational Databases," Proceedings of 18th International Conference on Data Engineering, 2002, 12 pp.
Agrawal, S., S Chaudhuri and G. Das, "DBXplorer: Enabling Keyword Search over Relational Databases", Proceedings of the 2002 ACM SIGMOD International Conference on Management on Date, 2002, p. 627.
Bhalotia, G., A. Hulgeri, C Nakhe, S. Chakrabarti and S. Sudarshan, "Keyword Searching and Browsing in Databases Using BANKS", Proceedings of the 18th International Conference on Data Engineering, 2002, 10 pp.
Brin, S. and L. Page, "The Anatomy of a Large-Scale Hypertextual Web Search Engine", Computer Networks and ISDN Systems, vol. 30, No. 1-7, 1998, pp. 107-117.
Broder, A.Z., D. Carmel, M. Herscovichi, A. Soffer and J. Zien, "Efficient Query Evaluation Using a Two-Level Retrieval Process", Twelfth International Conference on Information Knowledge Management (CIKM 2003), 2003, pp. 426-434.
Broder, A.Z., S.C. Glassman, M.S. Manasse, and G. Zweig, "Syntactic Clustering of the Web", Computer Networks and ISDN Systems, vol. 29, Iss. 8-13, 1997, pp. 1157-1166.

Bruno, N., K. Koudas and D. Srivastava, "Holistic Twig Joins: Optimal XML Pattern Matching", Proceedings of the 2002 ACM SIGMOD International Conference on Management of Data, 2002, pp. 310-321.

Carmel, D., Y. Maarek, M. Mandelbrod, Y. Mass and A. Soffer, "Searching XML. Documents via XML Fragments," Proceedings of the 26th Annual International ACM SIGIR Conference on Research and Development in Information Retrieval, 2003, pp. 151-158.

Fontoura, M., E. Shekita, J. Zien, S. Rajagopalan and A. Neumann, "High Performance Index Build Algorithms for Intranet Search Engines", Proceedings of 30th International Conference on Very Large Data Bases, 2004, pp. 1158-1169.

French, G., "Hacking the Google Numrange Operator", [online], Apr. 1, 2004, [retrieved on Aug. 31, 2004], retrieved from the Internet at <URL:http://www.webpronews.com/insiderreports/searchinsider/wpn-49-20040401HackingtheGoogleNumrangeOperator.html>.

Google, "Advanced Search", [online], 2003, [retrieved on Aug. 31, 2004], retrieved from the Internet at <URL: http://www.google.com/help/refinesearch.html>.

Gravano, L., P.G. Ipeirotis, N. Koudas and D. Srivastava, "Text Joins in an RDBMS for Web Data Integration", Proceedings of the 12th International Conference on World Wide Web, 2003, pp. 90-101.

Guttman, A., "R-Trees: A Dynamic Index Structure for Spatial Searching", Proceedings of the 1984 ACM SIGMOD International Conference on Management of Data, 1984, pp. 47-57.

Hristidis, V. and Y. Papakonstantinou, "Discover: Keyword Search in Relational Databases", Proceedings of the 28th VLDB Conference, 2002, 12 pp.

Kaushik, R., R. Krishnamurthy, J.F. Naughton and R. Ramakrishnan, "On the Integration of Structure Indexes and Inverted Lists," Proceedings of the 20th International Conference on Data Engineering, 2004, 1 pg.

Melnik, S., S. Raghavan, B. Yang and H. Garcia-Molina, "Building a Distributed Full-Text Index for the Web," ACM Transactions on Information Systems, vol. 19, No. 3, Jul. 2001, pp. 217-241.

Press, W.H., B.P. Flannery, S.A. Teukolsky and W.T. Vetterling, "Numerical Recipes in C: The Art of Scientific Computing", 1998, Ch. 9, pp. 258-263.

Raghavan, S. and H. Garcia-Molina, "Complex Queries over Web Repositories", Proceedings of the 29th VLDB Conference, 2003, pp. 33-44.

Raghavan, S. and H. Garcia-Molina, "Integrating Diverse Information Management Systems: A Brief Survey", IEEE Data Engineering Bulletin, 2001, vol. 24, No. 4, pp. 44-52.

Ramsak, F., V. Markl, R. Fenk, M. Zirkel, K. Elhardt and R. Bayer, "Integrating the UB-Tree into a Database System Kernel", Proceedings of 26th International Conference on Very Large Data Bases, Sep. 2000, pp. 263-272.

Spertus, E. and L.A. Stein, "Squeal: A Structured Query Language for the Web", Proceedings of the 9th international World Wide Web Conference on Computer Networks, 2000, pp. 95-103.

U.S. Appl. No. 11/182,334, filed Jul. 14, 2005, entitled "Enforcing Native Access Control to Indexed Documents", invented by R. Lempel, T. Leyba, J.A. McPherson, Jr., and J.L. Perez.

U.S. Appl. No. 11/295,397, filed Dec. 5, 2005, entitled "Improving Text Search Quality by Exploiting Organizational Information", invented by T. Hampp, M. Baessler, A. Lang, T.W. Goetz, A. Baader, and J. Doerre.

Lomet, D. (Ed.), "Bulletin of the Technical Committee on Data Engineering", Dec. 2001, vol. 24, No. 4, 56 pp.

Lu, W, L. Chien, & H. Lee, "Anchor Text Mining for Translation of Web Queries", Proceedings from the International Conference on Data Mining, Nov. 2001, pp. 401-408.

PCT International Search Report and Written Opinion, May 6, 2005, for International Application No. PCT/EP2005/050321.

PCT International Search Report and Written Opinion, Oct. 30, 2006, for International Application No. PCT/EP2006/064281.

EP Office Action, Dec. 28, 2007, for European Application No. 05 701 609.9-2201, 6 pp.

Lu, W., L. Chien, and H. Lee, "Anchor Text Mining for Translation of Web Queries", Proceedings of First IEEE International Conference on Data Mining, 2001, pp. 401-408.

* cited by examiner

| CPUs | IndexBuildRun(s) | IndexMerge(s) | Speedup versus baseline |
|---|---|---|---|
| 1 | 617 | 486 | 0 % |
| 1+1HT | 521 | 417 | 18 % |
| 2 | 421 | 318 | 49 % |
| 2+2HT | 422 | 343 | 44 % |

FIG. 5A

| Documents | Index Size | IndexBuildRuns(s) | IndexMerge(s) |
|---|---|---|---|
| 200,000 | 1.32GB | 166.7 | 154.8 |
| 500,000 | 3.14GB | 417.5 | 341.1 |
| 2,000,000 | 12.3GB | 1,713.7 | 1,345.1 |
| 6,000,000 | 33.4GB | 4,632.5 | 3,775.8 |

FIG. 5B

ARCHITECTURE FOR AN INDEXER WITH FIXED WIDTH SORT AND VARIABLE WIDTH SORT

BACKGROUND OF THE INVENTION

1. Field of the Invention

The present invention is related generally to an architecture for an indexer and more particularly to an architecture for an indexer that indexes tokens that may be variable-length, where variable-length data may be attached to at least one token occurrence.

2. Description of the Related Art

The World Wide Web (also known as WWW or the "Web") is a collection of some Internet servers that support Web pages that may include links to other Web pages. A Uniform Resource Locator (URL) indicates a location of a Web page. Also, each Web page may contain, for example, text, graphics, audio, and/or video content. For example, a first Web page may contain a link to a second Web page.

A Web browser is a software application that is used to locate and display Web pages. Currently, there are billions of Web pages on the Web.

Web search engines are used to retrieve Web pages on the Web based on some criteria (e.g., entered via the Web browser). That is, Web search engines are designed to return relevant Web pages given a keyword query. For example, the query "HR" issued against a company intranet search engine is expected to return relevant pages in the intranet that are related to Human Resources (HR). The Web search engine uses indexing techniques that relate search terms (e.g., keywords) to Web pages.

An important problem today is searching large data sets, such as the Web, large collections of text, genomic information, and databases. The underlying operation that is needed for searching is the creation of large indices of tokens quickly and efficiently. These indices, also called inverted files, contain a mapping of tokens, which may be terms in text or more abstract objects, to their locations, where a location may be a document, a page number, or some other more abstract notion of location. The indexing problems is well-known and nearly all solutions are based on sorting all tokens in the data set. However, many conventional sorting techniques are inefficient.

Thus, there is a need for improved indexing techniques.

SUMMARY OF THE INVENTION

Provided are a method, system, and program for indexing data. A token is received. It is determined whether a data field associated with the token is a fixed width. When the data field is a fixed width, the token is designated as one for which fixed width sort is to be performed. When the data field is a variable length, the token is designated as one for which a variable width sort is to be performed.

BRIEF DESCRIPTION OF THE DRAWINGS

Referring now to the drawings in which like reference numbers represent corresponding parts throughout:

FIG. 5A illustrates a table of benchmark test results for index build threading and hyperthreading in accordance with certain implementations of the invention.

FIG. 5B illustrates a table of index build scaling performances in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Implementations of the invention provide a fast technique for creating indices by using a dual-path approach in which the task of sorting (indexing) is broken into two separate sort processes for fixed width and variable width data.

Figure 1:
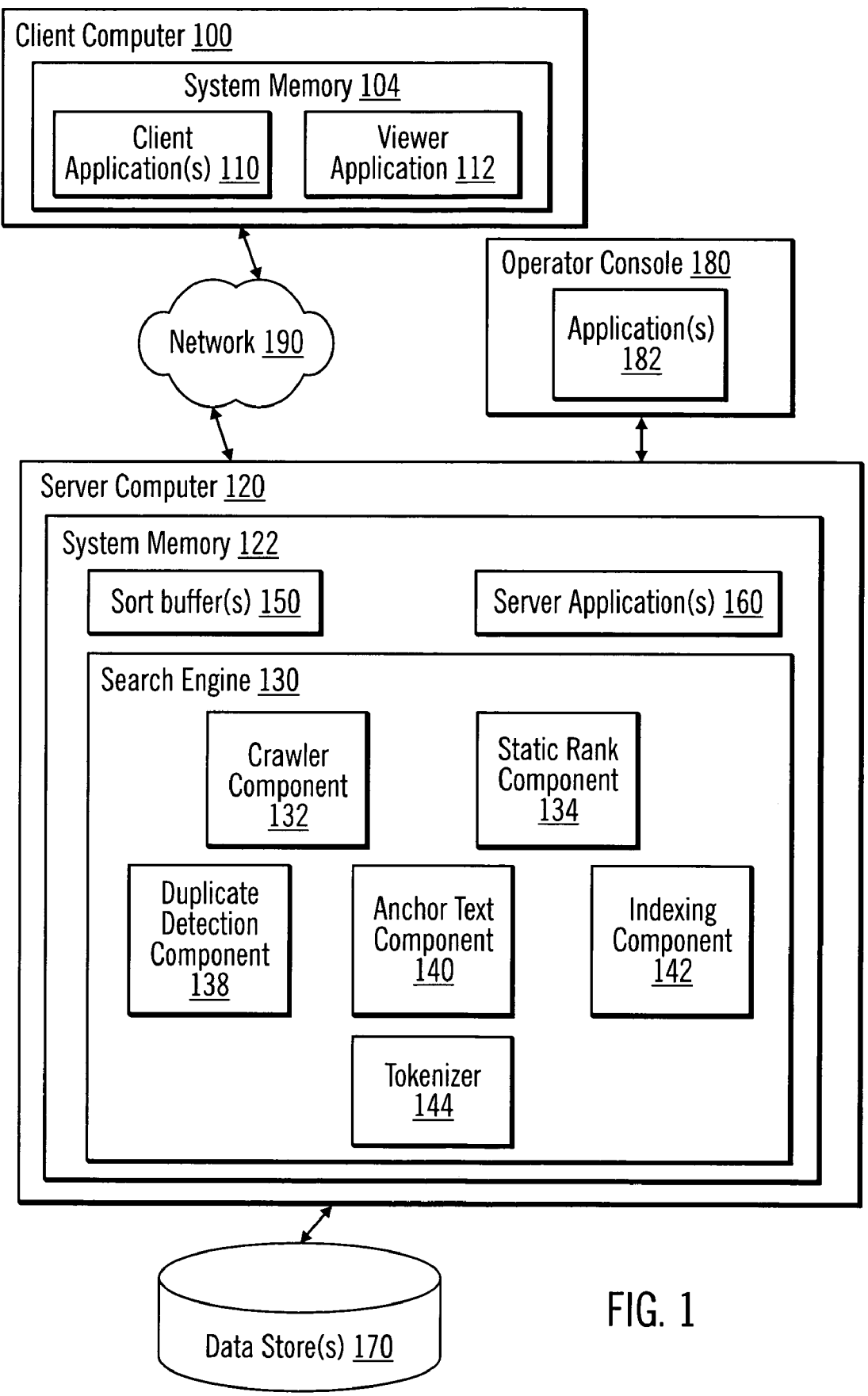
FIG. 1 illustrates, in a block diagram, a computing environment in accordance with certain implementations of the invention.

FIG. 1 illustrates, in a block diagram, a computing environment in accordance with certain implementations of the invention. A client computer 100 is connected via a network 190 to a server computer 120. The client computer 100 may comprise any computing device known in the art, such as a server, mainframe, workstation, personal computer, hand held computer, laptop telephony device, network appliance, etc. The network 190 may comprise any type of network, such as, for example, a Storage Area Network (SAN), a Local Area Network (LAN), Wide Area Network (WAN), the Internet, an Intranet, etc. The client computer 100 includes system memory 104, which may be implemented in volatile and/or non-volatile devices. One or more client applications 110 and a viewer application 112 may execute in the system memory 104. The viewer application 112 provides an interface that enables searching of a set of documents (e.g., stored in one or more data stores 170. In certain implementations, the viewer application 112 is a Web browser.

The server computer 120 includes system memory 122, which may be implemented in volatile and/or non-volatile devices. A search engine 130 executes in the system memory 122. In certain implementations, the search engine includes a crawler component 132, a static rank component 134, a duplicate detection component 138, an anchor text component 140, an indexing component 142, and a tokenizer 144. Although components 132, 134, 138, 140, 142, and 144 are illustrated as separate components, the functionality of components 132, 134, 138, 140, 142, and 144 may be implemented in fewer or more or different components than illustrated. Additionally, the functionality of the components 132, 134, 138, 140, 142, and 144 may be implemented at a Web application server computer or other server computer that is connected to the server computer 120. Additionally, one or more server applications 160 execute in system memory 122. System memory 122 also includes one or more in-memory sort buffers 150.

The server computer 120 provides the client computer 100 with access to data in at least one data store 170 (e.g., a database). Although a single data store 170 is illustrated, for ease of understanding, data in data store 170 may be stored in data stores at other computers connected to server computer 120.

Also, an operator console 180 executes one or more applications 182 and is used to access the server computer 120 and the data store 170.

The data store 170 may comprise an array of storage devices, such as Direct Access Storage Devices (DASDs), Just a Bunch of Disks (JBOD), Redundant Array of Independent Disks (RAID), virtualization device, etc. The data store 170 includes data that is used with certain implementations of the invention.

The goal of text indexing is to take an input document collection (a "document-centric" view) and produce a term-centric view of the same data. In the term-centric view, data is organized by term, and for each term, there is a list of occurrences (also referred to as postings). A posting for a term consists of a list of the documents and offsets within the document that contain the term. In addition, it is useful (e.g., for ranking) to attach some extra attributes to each term occurrence. Some example attributes include, whether the term occurs in a title, occurs in anchor text or is capitalized.

Indexing is equivalent to a sorting problem, where a primary sort key is a term and a secondary sort key is an offset in the document. For example, document D1 contains "This is a test", document D2 contains "Is this a test", and document D3 contains "This is not a test". Table A illustrates term information in tabular form, ordered as the terms would be read in from documents D1, D2, and D3 (in that order), in accordance with certain implementations of the invention.

TABLE A

| Term | Document Identifier | Offset | Data |
|---|---|---|---|
| this | 1 | 0 | 1 |
| is | 1 | 1 | 0 |
| a | 1 | 2 | 0 |
| test | 1 | 3 | 0 |
| is | 2 | 0 | 1 |
| this | 2 | 1 | 0 |
| a | 2 | 2 | 0 |
| test | 2 | 3 | 0 |
| this | 3 | 0 | 1 |
| is | 3 | 1 | 0 |
| not | 3 | 2 | 0 |
| a | 3 | 3 | 0 |
| test | 3 | 4 | 0 |

The first column in Table A is the term, the second column is the document identifier, and the third column is the offset in the document. fourth column is a data field, and, in this example, the data field indicates whether a term is case-folded (capitalized), where 1 is used to indicate that the term is case-folded and a 0 indicates that the term is not case-folded.

Sorting is also accompanied by a compression, where the final index is written in a compact, easily searchable form. Table B illustrates sorted terms from Table A in accordance with certain implementations of the invention.

TABLE B

| Term | Document | Offset | Data |
|---|---|---|---|
| a | 1 | 2 | 0 |
| a | 2 | 2 | 0 |
| a | 3 | 3 | 0 |
| is | 1 | 1 | 0 |
| is | 2 | 0 | 1 |
| is | 3 | 1 | 0 |
| not | 3 | 2 | 0 |
| test | 1 | 3 | 0 |
| test | 2 | 3 | 0 |
| test | 3 | 4 | 0 |
| this | 1 | 0 | 1 |
| this | 2 | 1 | 0 |
| this | 3 | 0 | 1 |

Posting lists may be represented more compactly by grouping together occurrences of a term in a list as illustrated in Table C:

TABLE C

| a | (1, 2, 0), (2, 2, 0), (3, 3, 0) |
|---|---|
| is | (1, 1, 0), (2, 0, 1), (3, 1, 0) |
| not | (3, 2, 0) |
| test | (1, 3, 0), (2, 3, 0), (3, 4, 0) |
| this | (1, 0, 1), (2, 1, 0), (3, 0, 1) |

For example, one posting list is: this (1,0,1), (2,1,0), (3,0,1). The posting lists may be stored in a compressed binary format, but, for illustration, the logical view of each posting list is provided. In certain implementations, the document identifier and offset values in the posting lists are delta encoded and then compressed.

Figure 2:
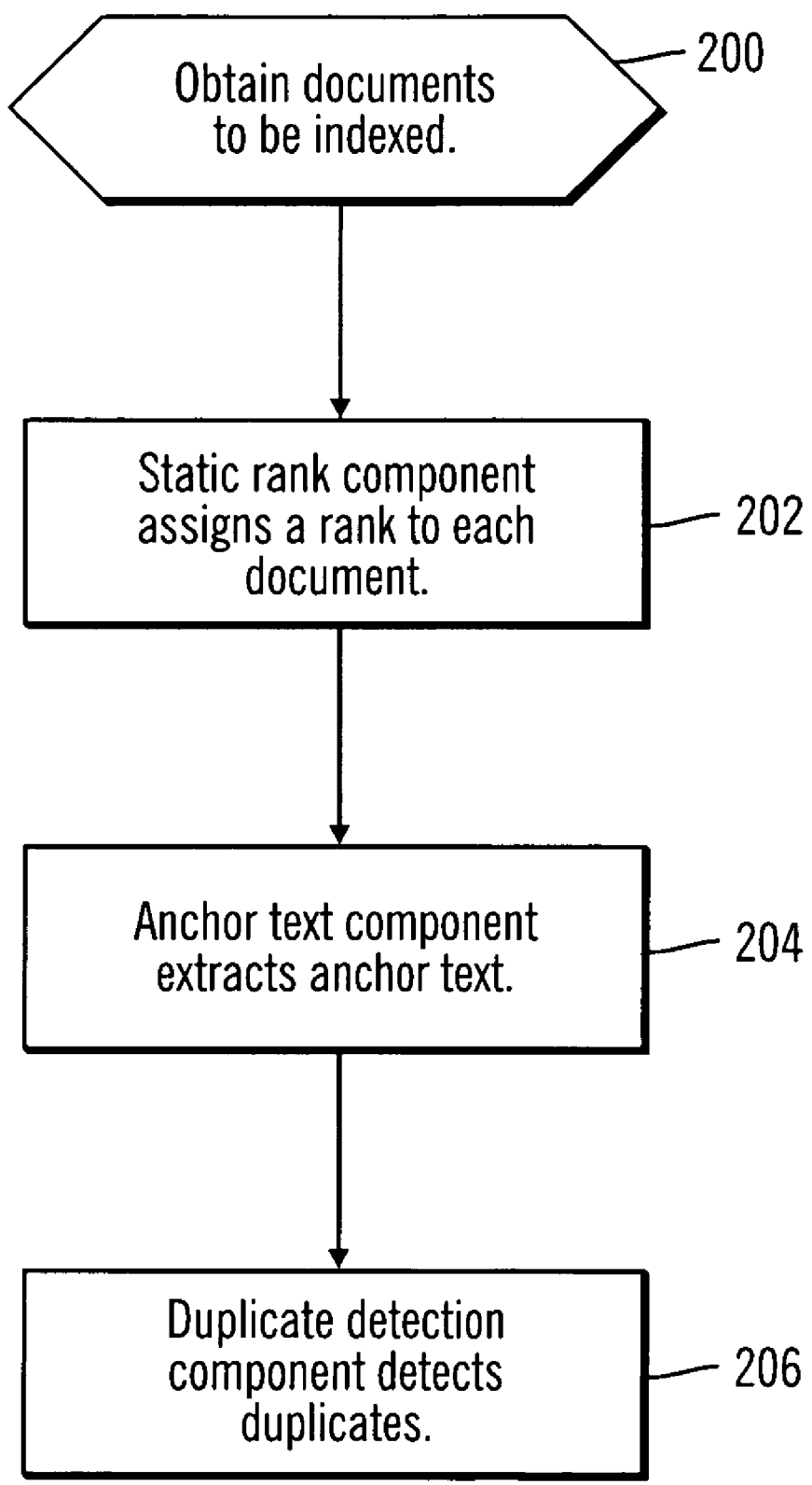
FIG. 2 illustrates logic implemented prior to generation of an index in accordance with certain implementations of the invention.

FIG. 2 illustrates logic implemented before generating an index in accordance with certain implementations of the invention. Control begins at block 200 and documents that are to be indexed by the search engine 130 are obtained. In certain implementations, the documents are published or pushed (e.g., as may be the case with newspaper articles) to the indexing component 142. In certain implementations, the crawler component 132 discovers, fetches, and stores the documents. In certain implementations, the crawler component 132 may discover documents based on, for example, certain criteria (e.g., documents were accessed within the last month). Additionally, the crawler component 132 may discover documents in one or more data stores connected directly (e.g., data store 170) or indirectly (e.g., connected to server computer 120 via another computing device (not shown)) to server computer 120. In certain implementations, the crawler component 132 discovers, fetches, and stores Web pages in data store 170.

The documents are bundled in files in data store 170. That is, when documents are retrieved by the crawler component 132, one or more documents are stored into a file, called a bundle. The bundle includes as many documents as fit into the bundle, based on the size allocated for a bundle. In certain implementations, the bundle size defaults to 8 MB (megabytes). Having bundles improves performance by allowing large batches of documents to be fetched at once using sequential I/O. Otherwise, if each of the documents was retrieved as a separate file, the seeks times would impact performance.

Doing a scan of the document store 170 is I/O bound. Each document in the data store contains a tokenized document content (e.g., stored in data vectors), and includes both an original token and a stemmed token. A tokenized document content may be described as breaking a document into individual terms with tokens determining word boundaries. An original token refers to an original term in a document (e.g., "running") that includes case-folding, while a stemmed token refers to a root for the original token (e.g., "run").

An arbitrary binary data field may be attached with each token occurrence. In certain implementations, this data field is a one byte attribute field for document text tokens. In certain implementations, the data field may be of varying width (e.g., for document metadata tokens). For instance, some metadata tokens include the document keyword count, document unique keyword count, document path (e.g., URL or hash), site path (e.g., URL or hash), and document rank.

The tokenized content is stored in the data store 170 for performance reasons. That is, tokenization and parsing are slow and CPU intensive. Once the bulk of documents have been crawled, there are typically small incremental updates to the data store 170. Thus, rather than re-running the tokenizer each time an index is to be built (e.g., once a day), the stored tokenized document content is used to build the index.

In block 202, the static rank component 134 reviews the stored documents and assigns a rank to the documents. The rank may be described as the importance of the source document relative to other documents that have been stored by the crawler component 132. Any type of ranking technique may be used. For example, documents that are accessed more frequently may receive a higher rank.

Thus, document ranks are computed prior to indexing, and the rank value is available at indexing time as part of a document. In certain implementations, the rank is an ordinal document rank (e.g., 1, 2, 3, 4, etc.), so as the documents come in, the document rank may be used as the document identifier. The ordinal document ranks are monotonically increasing, though they are not necessarily sequential (e.g., there may be gaps as documents are being scanned). Documents need not be fed to the indexing component 142 in rank order, instead, documents may be fed in using an arbitrary ordering.

In block 204, an anchor text component 140 extracts anchor text and builds a virtual document with the anchor text. In block 206, optionally, the duplicate detection component 138 may perform duplication detection to remove duplicate documents from data store 170. The duplicate detection processing may also occur as documents are being stored.

There are many variations on indexing and on compressing posting lists. One approach is a sort-merge approach, in which sets of data are read into memory, each set sorted, and each set copied to storage (e.g., disk), producing a series of sorted runs. The index is generated by merging the sorted runs.

In certain implementations, the indexing component 142 implements a sort-merge approach. The sort-merge approach provides good performance and is suitable for batch style indexing in which data is indexed at once. Internally, the indexing component 142 has two phases: index build runs and index merge.

Figure 3A:
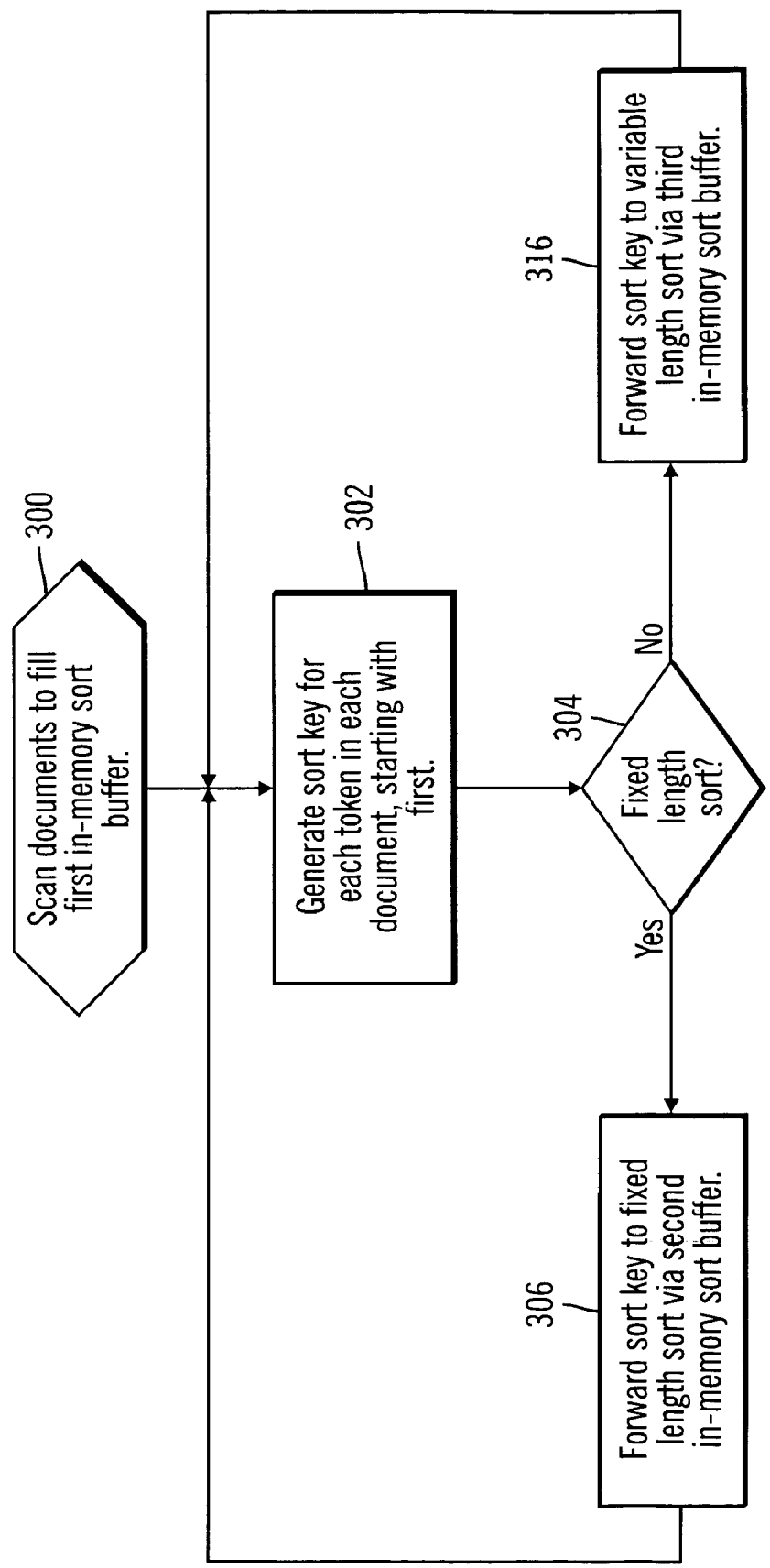
FIGS. 3A, 3B, and 3C illustrate logic implemented for an index build phase in accordance with certain implementations of the invention.
Figures 3B, 3C:
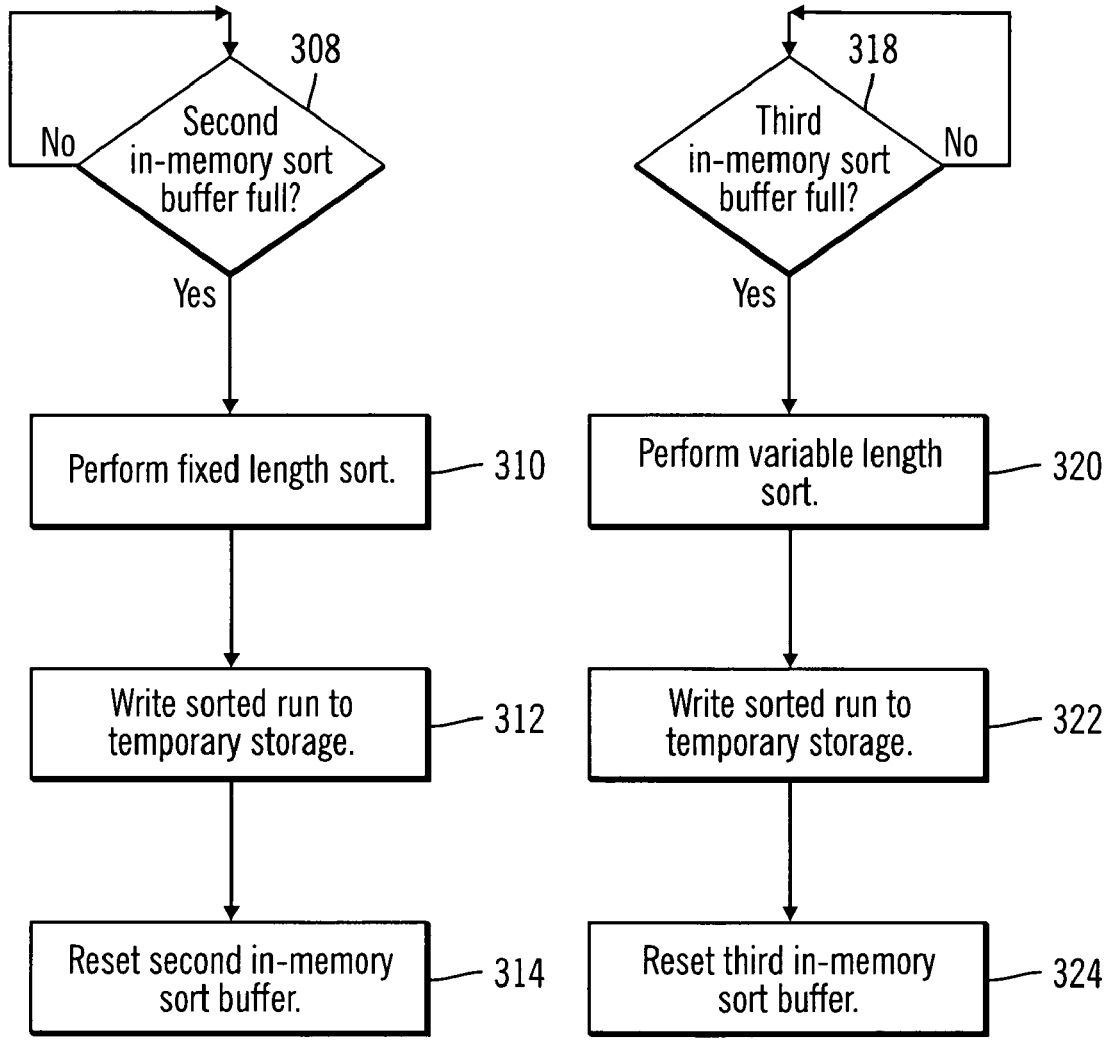
Figure 3D:
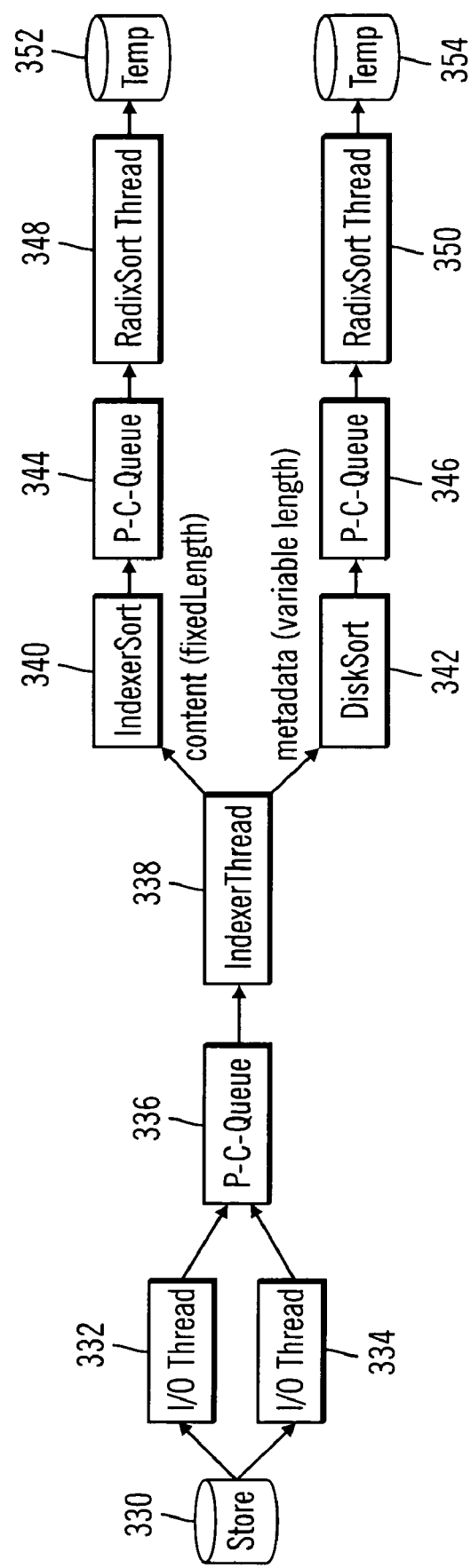
FIG. 3D illustrates multi-threading for performing index build runs in accordance with certain implementations of the invention.
Figure 3E:
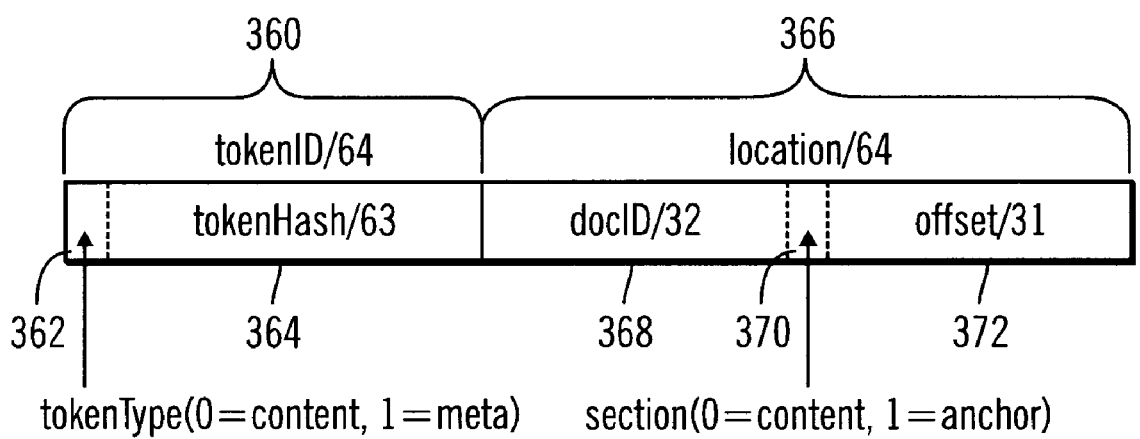
FIG. 3E illustrates a structure of a sort key in accordance with certain implementations of the invention.

FIGS. 3A, 3B, and 3C illustrate logic implemented for an index build phase in accordance with certain implementations of the invention. FIG. 3D illustrates multi-threading for performing index build runs in accordance with certain implementations of the invention. In FIG. 3A, control begins at block 300 with the indexing component 142 scanning documents in data store 170 to fill a first in-memory sort buffer. When data store 170 is capable of storing documents, the data store 170 may also be referred to as a "document store". In block 302, the indexing component 142 generates a sort key for each token in each document in the first in-memory sort buffer, starting with a first token and forwards the sort key to either a second or a third in-memory sort buffer. FIG. 3E illustrates a structure of a sort key in accordance with certain implementations of the invention. The sort key may be a 128-bit sort key that is composed of a token identifier 360 in the upper 64 bits (8 bytes) and a location 366 in the lower 64 bits. Additionally, a fixed-width or variable width data field may be carried along with the sort key. The token identifier 360 includes a bit 362 that specifies a token type (e.g., content or metadata) and 63 bits that identify a token hash 364.

Although any hash function may be used with various implementations of the invention, one that is fast and that works well on large amounts of text tokens that have many common prefixes and suffixes is useful. In certain implementations, Pearson's hash function is used, which is described further in "Fast Hashing of Variable-Length Text Strings" by Peter K. Pearson, Communications of the ACM, 33(6):677-680, June 1990. Pearson's hash function is scalable.

The location 366 includes a 32 bit unique document identifier 368, a bit 370 that indicates whether the section associated with the sort key is content or anchor text, and a 31 bit offset 372 that identifies the offset of the term within the document. When a document is read from the data store 170, the location of the document is generated using the document rank and the token offset within the document. Since a full sort is later done on the location, documents may arrive in any order, and the indexing component 142 is able to reorder them properly in rank order. Also, multiple terms may occur at a same location (e.g., which is useful for adding metadata to mark terms or sequences of terms).

Thus, rather than having separate document identifier (ID) fields and offset fields, certain implementations of the invention use a global 64-bit location 366 to identify the locations of terms. With the use of this 64-bit location, up to 4 billion documents are supported in one index, with 4 billion locations in each document. In alternative implementations, other bit sizes may be used for the global location. Also, each posting occurrence may have arbitrary binary data attached to it (e.g., for ranking).

Looking at the bit encoding of the sort key, by sorting on the sort key, implementations of the invention simultaneously order the index by the token identifier. Additionally, the encoding of the sort key allows the content tokens to come before the metadata tokens (allowing the two paths for the content (fixed width) and metadata (variable width) tokens to be sorted independently and brought together in the merge phase). The encoding of the sort key, for each unique token identifier, allows occurrences to be ordered by document identifier, and, if the document identifier is also the document rank, then, the tokens are in document rank order. Anchor text and content portions of a document may be processed separately and brought together because both portions have the same document identifier. For document occurrences of each token, the offsets of the occurrences within the document are in occurrence order due to the sorting technique used (e.g., due to the stable sort property of a radix sort). Tokens within a document may be fed in order, while anchor documents may be fed in after the content documents.

In block 304, the indexing component 142 determines whether a sort key is for a fixed width sort. If so, processing continues to block 306, otherwise, processing continues to block 316.

In block 306, the indexing component 142 forwards the sort key to a fixed width sort via the second in-memory sort buffer and processing loops back to block 302. In block 316, the indexing component 142 forwards the sort key to a variable width sort via the third in-memory sort buffer and processing loops back to block 302. If all documents in the first in-memory sort buffer have been processed, the indexing component 142 scans a new set of documents into the in-memory sort buffer for processing, until all documents have been processed.

In FIG. 3B, in block 308, the indexing component 142 determines whether the second in-memory sort buffer is full. If so, processing continues to block 310, otherwise, processing loops back to block 308. In certain implementations, in block 308, the indexing component 142 treats a sort buffer as full if all tokens in all documents have been processed, and so additional sort keys will not be added to the sort buffer. In block 310, the indexing component 142 performs a fixed width sort on the sort keys in the second in-memory sort buffer. In block 312, the indexing component 142 writes the sorted run to temporary storage. In block 314, the indexing component 142 resets the second in-memory sort buffer, which allows additional sort keys to be stored in the second in-memory sort buffer.

In FIG. 3C, in block 318, the indexing component 142 determines whether the third in-memory sort buffer is full. If so, processing continues to block 320, otherwise, processing loops back to block 318. In certain implementations, in block 308, the indexing component 142 treats a sort buffer as full if all tokens in all documents have been processed, and so additional sort keys will not be added to the sort buffer. In block 320, the indexing component 142 performs a variable width sort on the sort keys in the third in-memory sort buffer. In block 322, the indexing component 142 writes the sorted run to temporary storage. In block 324, the indexing component 142 resets the third in-memory sort buffer, which allows additional sort keys to be stored in the third in-memory sort buffer.

The in-memory sort buffer controls the size of the sorted runs, which in turn is related to the total number of sorted runs generated. In certain implementations, each in-memory sort buffer is as large as possible as some systems have low limits on the number of file descriptors that may be opened at once. In particular, in certain implementations, each sort run is written to disk as a separate file, and, at merge time, all of these files are opened in order to perform the merging. In certain operating systems, each file that is currently open uses up a file descriptor, and, in some cases, there is a limit to the number of file descriptors (and thus files) that can be open at one time by a process. Additionally, the indexing component 142 uses a linear time in-memory sort technique so that performance does not change as the in-memory sort buffer size increases. In certain implementations, the in-memory sort buffer size defaults to 1.5 GB (gigabytes).

With reference to FIG. 3D, in a pipelined approach to indexing, pipelining speeds up indexing by allowing I/O and computation work to overlap. There are several places where the sort may be pipelined in implementations of the invention. First, prefetching read threads 332, 334 may be used to read in data from the data store 330 and store the data in a queue 336. An indexer thread 338 scans tokens in the documents, hashes the tokens, generates sort keys, and accumulates sort keys in a sort buffer. The indexer thread 338 forwards a sort key that is for content (i.e., fixed width data) to an indexer sort and forwards a sort key that is for metadata (i.e., variable width data) to a disk sort 342. The indexer sort 340 performs some processing and stores the sort keys in queue 344, and when queue 344 is full, a radix sort thread 348 performs a fixed width sort of the sort keys and stores the sorted keys as a sorted run in a temporary data store 352. The disk sort 346 performs some processing and stores the sort keys in queue 346, and when queue 346 is full, a radix sort thread 350 performs a variable width sort of the sort keys and stores the sorted keys as a sorted run in a temporary data store 354.

The indexing component 142 takes advantage of the fact that when inserting tokens of a document into an in-memory sort buffer, the locations of the tokens are being inserted in order. Since radix sort is a stable sort that preserves the inserted order of elements when there are ties, a 96-bit radix sort may be used, since the tokens within a document are inserted in order (these are the lower 32 bits of the sort key). Additionally, if there were no document location remapping, a 64-bit radix sort may be used. Because documents are inserted in arbitrary rank, and thus arbitrary document identifier order, a 96-bit radix sort is used.

Thus, when a sort buffer 344, 346 is full, the sort buffer 344, 346 is handed off to an appropriate sort thread that performs radix sort and writes the sorted run to storage.

In order to use the pipelined, parallel processing technique of FIG. 3D, the indexing component 142 replaces variable width tokens with a fixed width token identifier (e.g., by assigning a unique sequentially generated identifier number or using a hashing function). That is, the variable width tokens are transformed into fixed width tokens. When a uniquely generated identifier 360 is used, a mapping of terms to identifiers is maintained so that as terms are indexed, the terms are replaced with their identifiers. A hash function using a large hash space is unlikely to have collisions. In certain implementations, a 63-bit hash (reserving the upper for marking special meta-tokens) may be used. In addition, with use of the 63-bit hash, certain testing indicated that there were no collisions among 260 million terms. In certain alternative implementations, a hash function approach using a minimal perfect hash function that ensures that there are no collisions may be used.

In practice, a large percent (e.g., 99.9%) of the data fields are one byte long, while the remaining data fields are of variable width. Thus, the sorting may be separated into two sorts: one where the data fields are one byte and one where the data fields are variable width. This results in an optimizable fixed width field sorting problem in which a 128-bit sort key is composed of the term identifier in the upper 8 bytes and the location in the lower 8 bytes, along with a fixed-width data field (e.g., one byte) that is carried along with the sort key. Additionally, the variable width data field case may be handled by a slower, more general radix sort that works with variable width fields.

Figure 4A:
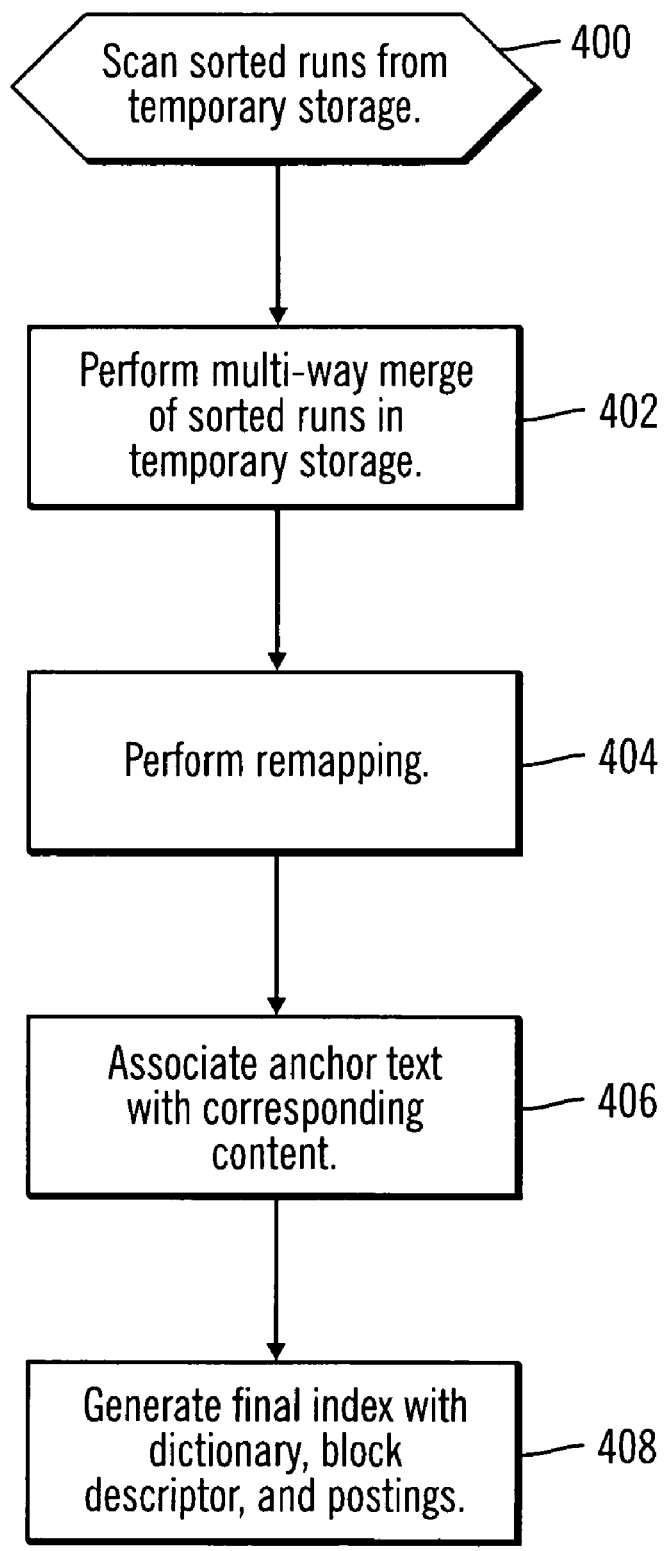
FIG. 4A illustrates logic implemented for an index merge phase in accordance with certain implementations of the invention.
Figure 4B:
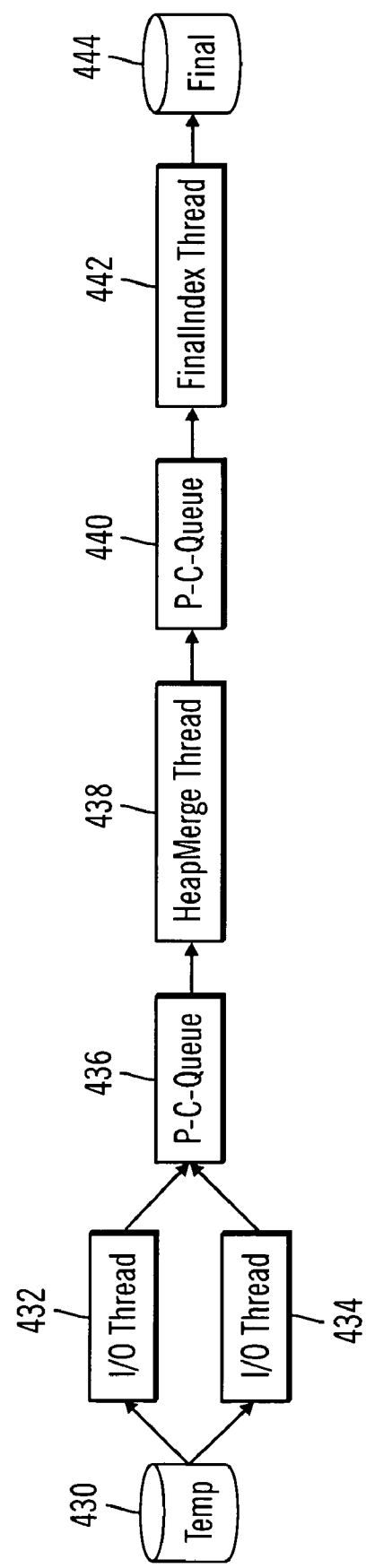
FIG. 4B illustrates threading for merging sorted runs in accordance with certain implementations of the invention.

FIG. 4A illustrates logic implemented for an index merge phase in accordance with certain implementations of the invention. FIG. 4B illustrates threading for merging sorted runs in accordance with certain implementations of the invention. In FIG. 4A, control begins at block 400 with the indexing component 142 scanning sorted runs from temporary storage. In block 402, the indexing component 142 performs a multi-way merge of the sorted runs. In the second phase (i.e., the index merge phase), the indexing component 142 uses, for example, a heap on top of each sorted run and performs a multi-way merge of the compressed sorted runs.

In block 404, the indexing component 142 performs remapping. It is possible that documents fed into the indexing component 142 have gaps in their rank value (e.g., documents 1, 6, 7, etc. are received, leaving a gap between ranks 1 and 6). The indexing component 142 remaps the rank locations to close up the gaps, ensuring that they are in sequence. In certain implementations, this is done by keeping a bit vector of the document identifiers that were put in the indexing component 142. In certain implementations, the bit vector is defined to be of the size of MaximumDocumentRank=50,000,000 bits so that the bit vector takes up about 48 MB. At the start of the multi-way merge phase, a remapping table is built that maps each document identifier to a new value. MaximumDocumentRank may be described as a value for a maximum document rank. In certain implementation, this table is MaximumDocumentRank*(4 bytes)=191 MB in size. During the multi-way merge phase, each token document identifier is remapped to remove the gaps. In certain implementations, the remap table is not allocated until after the sort buffer (e.g., the second or third in-memory sort buffer referenced in blocks 308 and 318, respectively) has been deallocated.

In block 406, the indexing component 142 associates anchor text with corresponding content. That is, the indexing component 142 also brings together multiple pieces of a document if they are read from the data store at different times. In certain implementations, two document pieces are supported: a content section and an anchor text section. In certain implementations, the content section arrives and then the anchor text section arrives at a later time. This feature of the indexing component 142 is used to append anchor text to a document by giving anchor text locations in which the upper bit of the offset is set. Prior to indexing, the anchor text is extracted and a virtual document is built with the anchor text. This allows for sending the content of a document separately from the anchor text that points to the document. The content section and anchor text section may be correlated using a common document identifier.

Figure 4C:
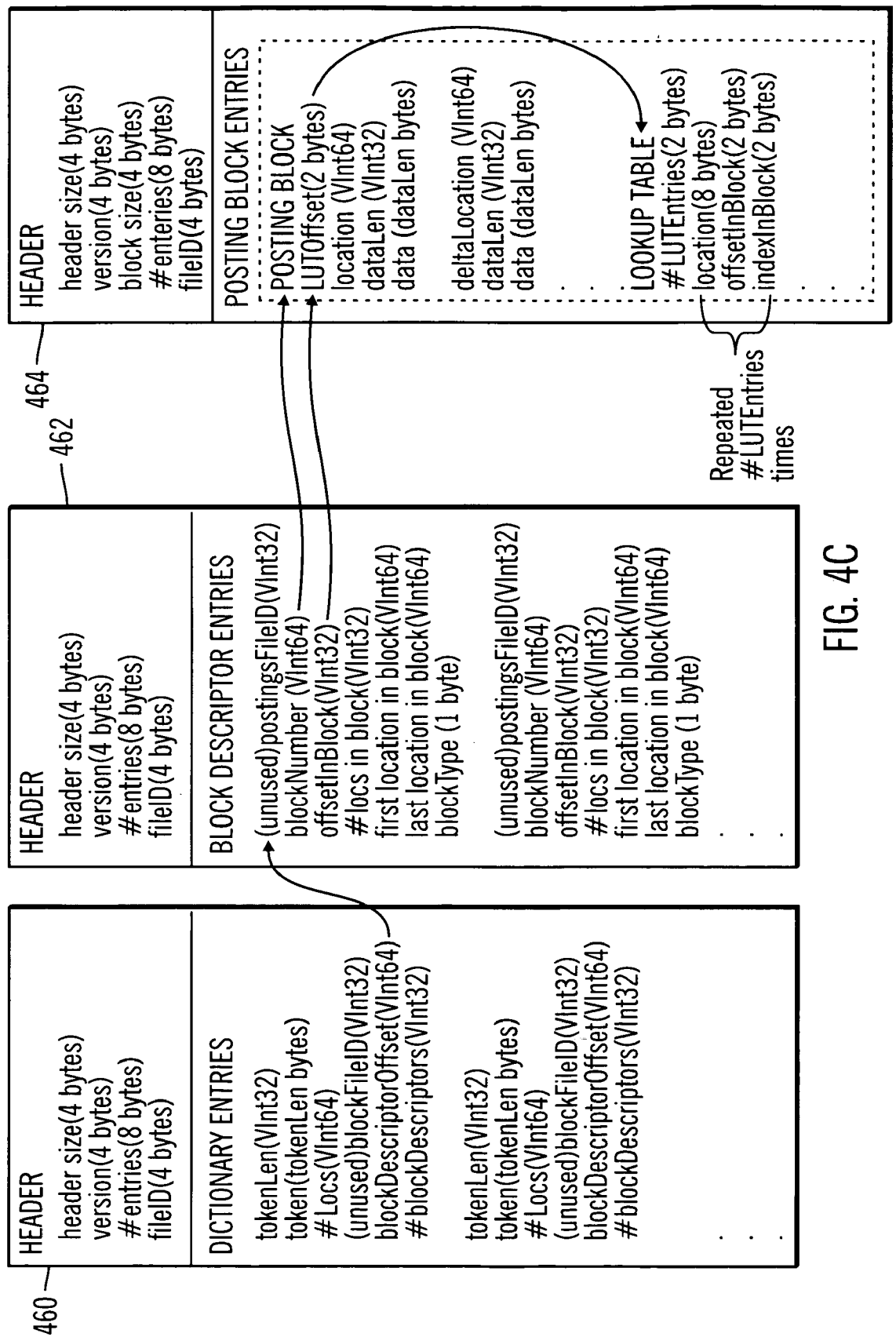
FIG. 4C illustrates output of an indexing component in accordance with certain implementations of the invention.

In block 408, the indexing component 142 generates a final index with a dictionary, a block descriptor, and postings. FIG. 4C illustrates output of the indexing component 142 in accordance with certain implementations of the invention. In certain implementations, the indexing component 142 writes three types of output files: a dictionary file 460, a block descriptor file 462, and a postings file 464. The dictionary file 464 contains the terms, certain statistics for each term, and a pointer to the blocks that contain the term. The block descriptor file 462 contains pointers into blocks of the postings file 464 and certain additional information that is useful for random-access. The blocks in the postings file 464 may be the smallest unit of I/O performed on the postings file 464 (e.g., one block may be 4096 bytes). The postings file 464 contains raw posting list information for the terms and includes the location and data field, along with a fast-access lookup table. The intra-block lookup table may be used to increase query performance. Without the lookup table, if an average random posting is in the middle of a block, then, accessing that posting would require starting from the first element in the block and decompressing and scanning each element prior to the desired posting. The lookup table allows accessing the location nearer to the block, which saves a large amount of unnecessary decompression work.

In FIG. 4C, the numbers in parenthesis are the number of bytes used to encode a particular field. For example, for fields labeled (VInt32), a compressed variable width byte encoding of a 32-bit number is used, and for fields labeled (VInt64), a compressed variable width byte encoding of a 65-bit number is used. In certain implementations, because the final files may grow large, there may be file splitting of final files.

Reordering posting lists in document rank order is useful so that documents with higher rank occur earlier in the posting list to allow for early termination of a search for terms using the index.

In FIG. 4B, during the merge phase, prefetching threads 432, 434 read data from the sorted runs in temporary storage 430 into a queue 436. A heap merge thread 438 is a multi-way merge thread that implements a heap merge, with results being stored in queue 440. A final index thread 442 outputs compressed index files to storage 444.

In certain implementations, 2-way Symmetric Multiprocessors (SMPs) may be utilized for the parallel processing of FIGS. 3D and 4B.

In certain alternative implementations, rather than using a sort-merge approach, the indexing component 142 uses a Move To Front (MTF) hash table to accumulate posting lists for terms in-memory. The MTF hash table allows a sort to be performed on the unique tokens (which are the hash keys), rather than on all occurrences. When an MTF hash table is used, dynamically resizable vectors are maintained to hold the occurrences of each term, which requires CPU and memory resources.

FIG. 5A illustrates a table 500 of benchmark test results for index build threading and hyperthreading in accordance with certain implementations of the invention. The benchmark test was run against an IBM x345 2-way SMP with dual 2.4 Ghz (gigahertz) processors, with 4 Small Computer System Interface (SCSI) disks using software RAID 0. In the benchmark test, 500,000 documents were indexed, which is a 7 BG document data store. The multithreaded indexer design efficiently used dual processors. In table 500, HT refers to Hyper-Thread. For example, a 1 CPU with a 1 HyperThread CPU system increased performance by 18%, while a 2 CPU system increased performance by 44%.

FIG. 5B illustrates a table 510 of index build scaling performances in accordance with certain implementations of the invention. The data in table 510 indicates that indexing performance scales nearly linearly with index size. In table 510, the raw data store size was about 2.23 times larger than the index size.

Thus, the implementations of the invention provide a high performance, general purpose indexer designed for doing fast and high quality information retrieval. Certain implementations of the invention make use of a dual-path approach to indexing, using a high performance, pipelined radix sort. Additionally, implementations of the invention enable document rank ordering of posting lists, per-occurrence attribute information, positional token information, and the bringing together of documents in pieces (e.g., content and anchor text).

Thus, the sort for index creation takes as input a set of token occurrences (called postings) that include a token, the document the token occurs in, the offset within the document, and some associated attribute data. Postings are sorted by token, document, and offset, in that order, so the token is the primary sort key, the document is the secondary sort key, and the offset is the tertiary sort key. The data field is carried along through the sort process.

Implementations of the invention provide a high performance sort based on the fact that for many postings, the data field is of constant size. Using a fixed width token-ID to represent the token, the postings may be represented by a fixed width binary data structure. Also, the data field is a fixed width in many cases by construction. Therefore, a fast, fixed width sort may be used to sort the fixed width postings.

The postings that can not be handled by a fixed width sort are ones that have a variable width data field. These postings are sorted by a variable width sort. The results of both sorts are combined during a multi-way merge phase. In alternative implementations, the merge may be avoided, and the two sets of sorted postings may be maintained separately.

The sort keys are encoded so that, during the sorting process, the index is simultaneously ordered by term, terms are ordered by document ID, and offsets within documents are also ordered.

The offsets are encoded within a document so that multiple parts of a document are brought together automatically by the sort. Thus, the parts of a document may be fed into the index build separately. Conventional indexers require that documents be fed in as a whole.

In certain implementations, a radix sort may be used because the radix sort sorts in linear time for fixed width sort keys and is stable (i.e., preserves the original ordering of sort element when there are ties in a sort key). The stable sort property of radix sort is used to further improve indexing performance. In particular, if tokens in each part of a document are already in location order, sort is performed on the portion of the sort key that is needed to generate correct sort results.

If all tokens within a document are fed in order, the sort key need not use the offset portion, but can sort on token type, token, document identifier, and document section. If the document sections arrive in order, then the sort can be on token type, token, and document identifier. If the documents are in document rank order, the sort can be on token type and token.

Thus, the indexing component 142 may have different implementations, based on the order in which tokens, document sections, and documents arrive. For example, in certain implementations, the indexing component 142 recognizes that tokens of a given document are fed in order of appearance. In certain implementations, the indexing component 142 recognizes that for document sections, the content sections arrive before the anchortext sections. Also, in certain implementations, the indexing component 142 recognizes that the documents are fed in document rank order. Furthermore, in additional implementations, the indexing component 142 recognizes the order for two or more of tokens, document sections, and documents.

ADDITIONAL IMPLEMENTATION DETAILS

The described techniques for an architecture for an indexer may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which various implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2, 3A, 3B, 3C, and 4A describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2, 3A, 3B, 3C, and 4A may be implemented in software, hardware, programmable and non-programmable gate array logic or in some combination of hardware, software, or gate array logic.

Figure 6:
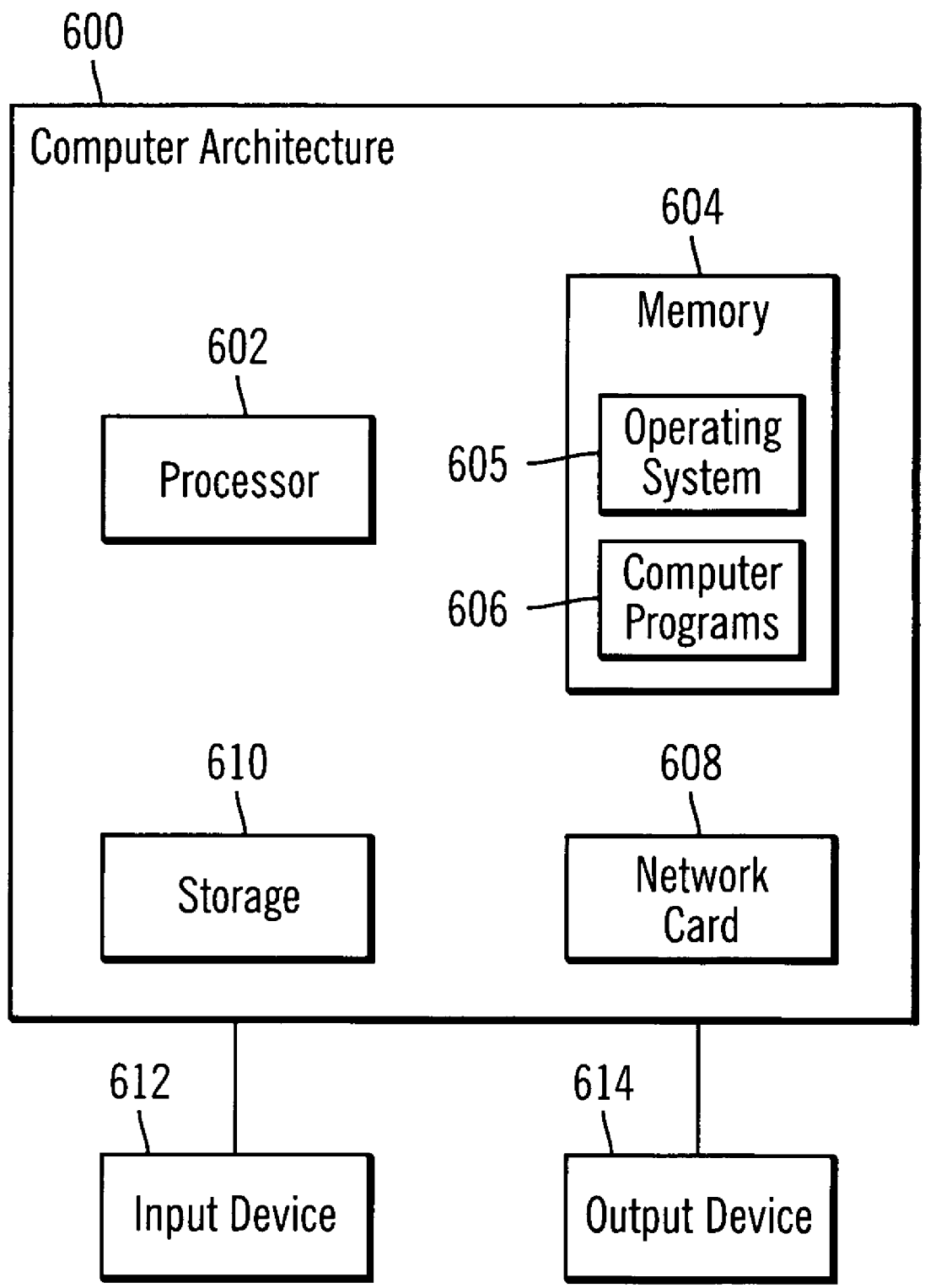
FIG. 6 illustrates an architecture of a computer system that may be used in accordance with certain implementations of the invention.

FIG. 6 illustrates an architecture of a computer system that may be used in accordance with certain implementations of the invention. For example, client computer 100, server computer 120, and/or operator console 180 may implement computer architecture 600. The computer architecture 600 may implement a processor 602 (e.g., a microprocessor), a memory 604 (e.g., a volatile memory device), and storage 610 (e.g., a non-volatile storage area, such as magnetic disk drives, optical disk drives, a tape drive, etc.). An operating system 605 may execute in memory 604. The storage 610 may comprise an internal storage device or an attached or network accessible storage. Computer programs 606 in storage 610 may be loaded into the memory 604 and executed by the processor 602 in a manner known in the art. The architecture further includes a network card 608 to enable communication with a network. An input device 612 is used to provide user input to the processor 602, and may include a keyboard, mouse, pen-stylus, microphone, touch sensitive display screen, or any other activation or input mechanism known in the art. An output device 614 is capable of rendering information from the processor 602, or other component, such as a display monitor, printer, storage, etc. The computer architecture 600 of the computer systems may include fewer components than illustrated, additional components not illustrated herein, or some combination of the components illustrated and additional components.

The computer architecture 600 may comprise any computing device known in the art, such as a mainframe, server, personal computer, workstation, laptop, handheld computer, telephony device, network appliance, virtualization device, storage controller, etc. Any processor 602 and operating system 605 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for indexing data, comprising:
   receiving different sections of a document at different times, wherein the different sections include a context section and an anchor text section;
   generating sort keys for each token of multiple tokens in the different sections, wherein the sort keys are used to create posting lists that simultaneously are ordered by token and by document identifier for each token, wherein a sort key includes a token type, a token, a document identifier, a document section, and an offset in a document; and for each of the multiple tokens:

determining if a data field associated with the token is a fixed width or a variable width, wherein the data field is fixed width for storing document content and variable width for storing document metadata;

when the data field is a fixed width, designating the token as one for which fixed width sort is to be performed; and when the data field is a variable length, designating the token as one for which a variable width sort is to be performed.

2. The method of claim 1, wherein the token is variable width and further comprising:

transforming the variable width token into a fixed width token.

3. The method of claim 1, further comprising:

performing a fixed width sort on one of dual code paths and a variable width sort on the other of dual code paths.

4. The method of claim 1, further comprising:

using the sort keys to bring together multiple sections of a document.

5. The method of claim 1, further comprising:

sorting on certain bits of each of the sort keys containing multiple bits.

6. The method of claim 5, further comprising:

sorting on uppermost bits of each of the sort keys.

7. A computer system, including logic for indexing data, comprising:

a processor; and receiving a token;

receiving different sections of a document at different times, wherein the different sections include a context section and an anchor text section;

generating sort keys for each token of multiple tokens in the different sections, wherein the sort keys are used to create posting lists that simultaneously are ordered by token and by document identifier for each token, wherein a sort key includes a token type, a token, a document identifier, a document section, and an offset in a document; and for each of the multiple tokens:

determining if a data field associated with the token is a fixed width or a variable width, wherein the data field is fixed width for storing document content and variable width for storing document metadata;

when the data field is a fixed width, designating the token as one for which fixed width sort is to be performed; and when the data field is a variable length, designating the token as one for which a variable width sort is to be performed.

8. The computer system of claim 7, wherein the token is variable width and wherein the logic further comprises:

transforming the variable width token into a fixed width token.

9. The computer system of claim 7, wherein the logic further comprises:

performing a fixed width sort on one of dual code paths and a variable width sort on the other of dual code paths.

10. The computer system of claim 7, wherein the logic further comprises:

using the sort keys to bring together multiple sections of a document.

11. The computer system of claim 7, wherein the logic further comprises:

sorting on certain bits of each of the sort keys containing multiple bits.

12. The computer system of claim 11, wherein the logic further comprises:

sorting on uppermost bits of each of the sort keys.

13. An article of manufacture comprising one of hardware logic and a computer readable storage medium including a program for indexing data, wherein the hardware logic or program causes operations to be performed, the operations comprising:

receiving different sections of a document at different times, wherein the different sections include a context section and an anchor text section; generating sort keys for each token of multiple tokens in the different sections, wherein the sort keys are used to create posting lists that simultaneously are ordered by token and by document identifier for each token, wherein a sort key includes a token type, a token, a document identifier, a document section, and an offset in a document; and for each of the multiple tokens:

determining if a data field associated with the token is a fixed width or a variable width, wherein the data field is fixed width for storing document content and variable width for storing document metadata;

when the data field is a fixed width, designating the token as one for which fixed width sort is to be performed; and when the data field is a variable length, designating the token as one for which a variable width sort is to be performed.

14. The article of manufacture of claim 13, wherein the token is variable width and wherein the operations further comprise:

transforming the variable width token into a fixed width token.

15. The article of manufacture of claim 13, wherein the operations further comprise:

performing a fixed width sort on one of dual code paths and a variable width sort on the other of dual code paths.

16. The article of manufacture of claim 13, wherein the operations further comprise:

using the sort keys to bring together multiple sections of a document.

17. The article of manufacture of claim 13, wherein the operations further comprise:

sorting on certain bits of each of the sort keys containing multiple bits.

18. The article of manufacture of claim 17, wherein the operations further comprise:

sorting on uppermost bits of each of the sort keys.

* * * * *